US007265686B2

(12) United States Patent
Hurst et al.

(10) Patent No.: US 7,265,686 B2
(45) Date of Patent: Sep. 4, 2007

(54) TOUCH SENSOR WITH NON-UNIFORM RESISTIVE BAND

(75) Inventors: G. Samuel Hurst, Knoxville, TN (US); R. H. Ritchie, Oak Ridge, TN (US); Robert J. Warmack, Knoxville, TN (US); Donald W. Bouldin, Brentwood, TN (US); Joel C. Kent, Fremont, CA (US)

(73) Assignee: Tyco Electronics Corporation, Middletown, PA (US)

( * ) Notice: Subject to any disclaimer, the term of this patent is extended or adjusted under 35 U.S.C. 154(b) by 400 days.

(21) Appl. No.: 10/619,915

(22) Filed: Jul. 15, 2003

(65) Prior Publication Data

US 2005/0012644 A1    Jan. 20, 2005

(51) Int. Cl.
*H03K 17/94* (2006.01)
(52) U.S. Cl. .......................... 341/33; 345/177; 341/34
(58) Field of Classification Search ............... 341/33, 341/34; 345/177, 173, 179; 178/18.04, 178/18.05, 19.04, 18.01
See application file for complete search history.

(56) References Cited

U.S. PATENT DOCUMENTS

| 3,591,718 A * | 7/1971 | Asano et al. ............ 178/18.06 |
| 3,911,215 A | 10/1975 | Hurst et al. ................. 178/18 |
| 4,198,539 A | 4/1980 | Pepper, Jr. .................. 178/18 |
| 4,220,815 A | 9/1980 | Gibson et al. |
| 4,293,734 A | 10/1981 | Pepper, Jr. |
| 4,661,655 A | 4/1987 | Gibson et al. |
| 4,731,508 A | 3/1988 | Gibson et al. |
| 4,822,957 A | 4/1989 | Talmage, Jr. et al. |
| 5,045,644 A | 9/1991 | Dunthorn |
| 5,220,136 A | 6/1993 | Kent |
| 5,815,141 A * | 9/1998 | Phares ........................ 345/173 |
| 6,163,313 A | 12/2000 | Aroyan et al. |
| 6,373,474 B1 | 4/2002 | Katabami |
| 6,400,359 B1 | 6/2002 | Katabami .................... 345/173 |
| 6,593,913 B1 * | 7/2003 | Krohn et al. ................ 345/168 |

(Continued)

FOREIGN PATENT DOCUMENTS

EP          0942390 A    3/1999

(Continued)

OTHER PUBLICATIONS

International Search Report for PCT/US2004/020581, mailed Nov. 4, 2004.

*Primary Examiner*—Brian Zimmerman
*Assistant Examiner*—Hung Q Dang

(57) ABSTRACT

A touch sensors with improved topological equivalence between an equipotential space and a Cartesian space to which the equipotential space will be mapped. The touch sensor comprises a substrate with a touch region, and a set of electrodes that are electrically coupled to the touch region. The touch sensor further comprises a plurality of resistive band segments that frames the touch region. The electrodes are located between the resistive band segments. Each resistive band segment has a resistivity that is intermediate between the resistivity of the electrodes and the resistivity of the touch region, thereby providing a transition between the low resistivity electrodes and the high resistivity touch region, and improving the topological equivalence within the corners of the touch region. At least one of the band segments has a non-uniform linear resistance to provide further improvement to the topological equivalence.

21 Claims, 12 Drawing Sheets

U.S. PATENT DOCUMENTS

| | | |
|---|---|---|
| 6,593,916 B1 | 7/2003 | Aroyan |
| 6,650,319 B1 | 11/2003 | Hurst et al. |
| 2002/0039094 A1 | 4/2002 | Yamada et al. |
| 2002/0135569 A1 | 9/2002 | Chen .......................... 345/173 |
| 2003/0164820 A1* | 9/2003 | Kent .......................... 345/177 |
| 2004/0061687 A1 | 4/2004 | Kent |

FOREIGN PATENT DOCUMENTS

| | | |
|---|---|---|
| WO | WO 02/37408 A | 5/2002 |
| WO | WO 2004/027593 A | 4/2004 |

* cited by examiner

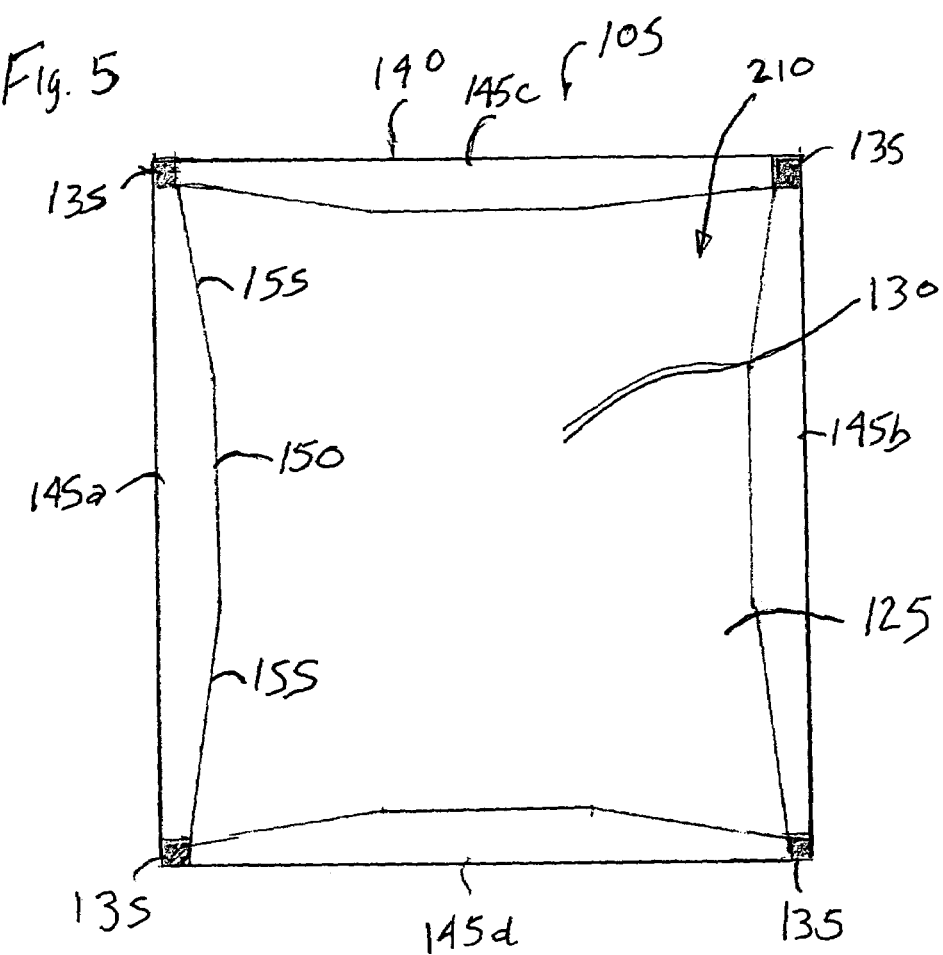

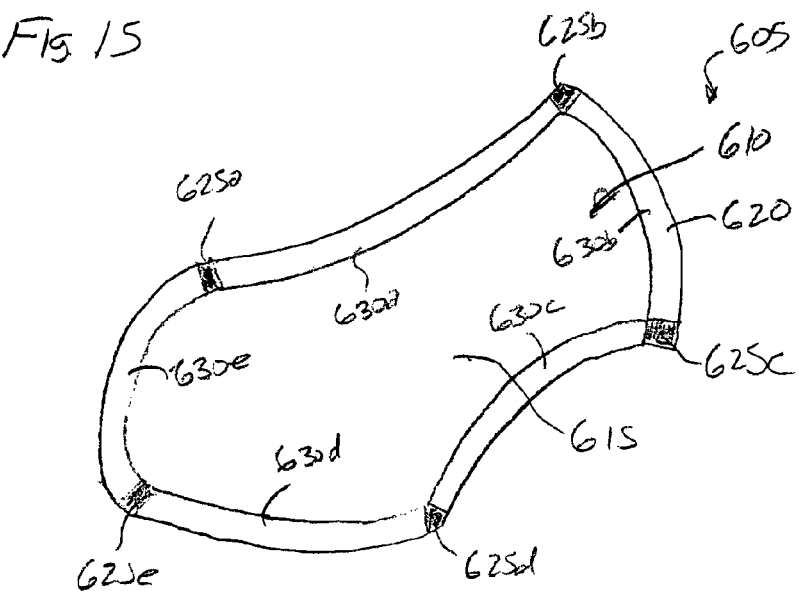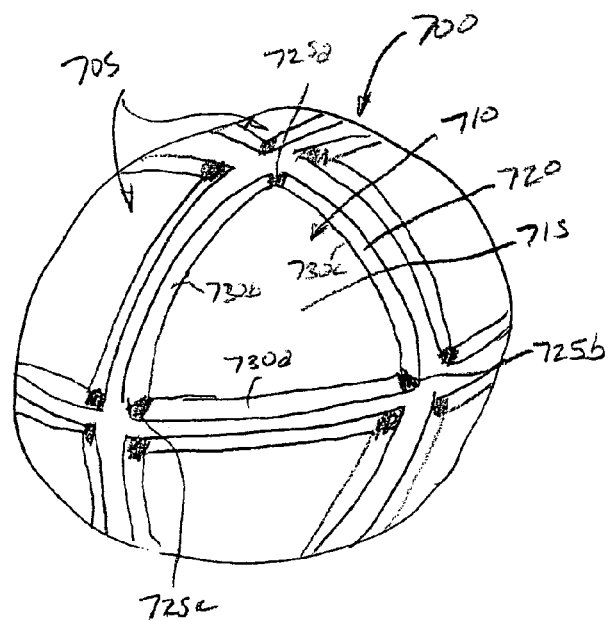

TOUCH SENSOR WITH NON-UNIFORM RESISTIVE BAND

FIELD OF THE INVENTION

The field of the present invention relates to touch sensor technology, and more particularly to resistive and capacitive touch sensor technology.

BACKGROUND OF THE INVENTION

Touch sensors are transparent or opaque input devices for computers and other electronic systems. As the name suggests, touch sensors are activated by touch, either from a user's finger, or a stylus or some other device. Transparent touch sensors, and specifically touchscreens, are generally placed over display devices, such as cathode ray tube (CRT) monitors and liquid crystal displays, to create touch display systems. These systems are increasingly used in commercial applications such as restaurant order entry systems, industrial process control applications, interactive museum exhibits, public information kiosks, pagers, cellular phones, personal digital assistants, and video games.

The dominant touch technologies presently in use are resistive, capacitive, infrared, and acoustic technologies. Touchscreens incorporating these technologies have delivered high standards of performance at competitive prices. All are transparent devices that respond to a touch by transmitting the touch position coordinates to a host computer. An important aspect of touchscreen performance is a close correspondence between true and measured touch positions at all locations within a touch sensitive area located on the touch sensor (i.e., the touch region).

FIGS. 1a and 1b illustrate a typical resistive touchscreen 20 in which voltage gradients have been sequentially applied to the surface of the touchscreen in x- and y-directions by electrically exciting subsets of electrodes located on the touchscreen. Resistive touchscreens of this type are typically known as 5-wire touchscreens (in contrast to 4-wire touchscreens in which x- and y-gradients are applied to distinct layers). When the resistive touchscreen is touched, the x- and y-coordinates of the touch location can be determined based on a measured voltage potential. As illustrated in FIGS. 1a and 1b, the voltage gradients applied to a touchscreen can be represented as equipotential lines (i.e., lines along which the voltage is constant). These equipotential lines (shown as dashed lines) generally extend between the top and bottom sides of the touchscreen (FIG. 1a) to provide a means for determining the x-coordinate of the touch location, and generally extend between the left and right sides of the touchscreen (FIG. 1b) to provide a means for determining the y-coordinate of the touch location. Also shown in FIGS. 1a and 1b is the direction (solid lines) of associated current flow as a consequence of the spatially varying potentials in the touchscreen.

Resistive touchscreen data are simplest to process when the relationship of measured potentials on the touchscreen is related to Cartesian coordinates in a simple and well-understood manner. In the mathematically simplest case, the measured potentials in the x- and y-directions are linearly related to the coordinates at the point touched. In this manner, the space defined by the voltage gradients can be directly mapped to the Cartesian space. For ideal linear touchscreen performance, the equipotential lines, i.e., lines along which the voltage is constant, must be perfectly straight lines, as shown in FIGS. 1a and 1b. Though many schemes have been proposed, commercial implementations of resistive touchscreens have generally employed linear relationships between measured potentials and spatial coordinates. For example, touchscreens that utilize complex peripheral discrete electrode patterns, such as those found in Elo TouchSystems' AccuTouch™ products and disclosed in U.S. Pat. No. 5,045,644, may be used to generally provide such linearity (at least at a predefined distance from the peripheral electrode patterns).

In simpler touchscreen designs, the measured potentials in the x- and y-directions may be not be linearly related, i.e., the equipotential lines are not straight. One of the simplest designs is that shown in the computer simulated touchscreen 10 of FIGS. 2a and 2b. This configuration consists of four electrodes 12 in the form of quarter-circles located at the corners of a rectangular, uniformly conducting touchscreen 10. FIG. 2a illustrates the equipotentials 14 when a unit potential difference is applied in the x-direction between the left and right electrode pairs, resulting in equipotential lines 14 that generally run in the y-direction. FIG. 2b illustrates the equipotentials 14 when the potential difference is maintained in the y-direction between the top and bottom electrode pairs, resulting in equipotential lines 14 that generally run in the x-direction. The term "generally" is used to stress that the uniform fields or equipotentials need not necessarily run parallel to the x- or y-axes. There is distortion (i.e., equipotentials are not evenly spaced nor are they parallel to the x- and y-axes), since the electrodes 12 are not designed to produce uniform fields.

Although the equipotential lines 14 illustrated in FIGS. 2a and 2b are non-linear, the space defined by the equipotential lines can be mapped to the Cartesian space in many cases. In this manner, every point on that touchscreen surface must have a unique value for the pair of potentials at that point. In topology, this uniqueness is expressed in terms of "topological equivalence." Two surfaces are topologically equivalent when all points on one surface can be mapped to unique points on the other surface.

When the voltage gradient is applied in the x-direction, let the voltage potential at any given touch location (x,y) be represented by the 2-D function v(x,y). Likewise when the voltage gradient is applied in the y-direction, let the 2-D potential function be represented by w(x,y). Note that in general, both the potential functions v(x,y) and w(x,y) are functions of both x and y. Because of this interdependence of potential upon both x and y, a single potential measurement cannot uniquely specify either x or y. Consequently, it is not possible to measure x independent of y, and y independent of x. The pair of potentials [v(x,y),w(x,y)], however, uniquely transforms to a point P(x,y) in the Cartesian space under certain conditions. Thus, with this uniqueness, operations can be found that will map the pair [v(x,y),w(x,y)] to a unique point P(x,y) in the Cartesian space.

The electrode configuration illustrated in FIGS. 2a and 2b would at first glance appear to be satisfactory when used under the umbrella of topological mapping concepts. Compared to linear touchscreens, non-linear touchscreens may be more economical to produce and demand less energizing power. Although the computational demands upon the processor may increase in order to uniquely map the measured potentials onto the Cartesian surface, the non-linear solution becomes increasingly attractive as the cost and performance of electronic processors improves.

As long as there is topological equivalence between the equipotential surface and the Cartesian surface, the use of non-linear architectures remains a viable solution. It can be seen from FIGS. 2a and 2b that an equipotential pair can be transformed to unique Cartesian coordinates over almost the entire area of the resistive surface. In the vicinity of the electrodes 12, however, there remains a problem of uniqueness. If a circular electrode is polarized in the x-direction, equipotentials near the circle are essentially circular and if polarized in the y-direction, these equipotentials are also essentially circular. Thus, the two equipotentials will be substantially collinear (i.e., parallel to each other). Because it is the intersection of these two equipotentials at a single point that uniquely determines the touch position, each pair of equipotentials created at a particular point in this small region near the electrodes 12 will not in practice uniquely transform to a Cartesian coordinate. This results in regions around the electrodes that are not suitable as a touch region—an undesirable effect in today's highly competitive touchscreen market. This will be referred to as the "poor-crossing" problem, and the regions where this occurs as the "poor-crossing" regions.

This poor-crossing problem is exacerbated by noise or uncertainty in the measurement of the voltage potentials, which tends to blur the intersection points of equipotential lines, such that a unique position cannot be determined within the poor-crossing region. Thus, the poor-crossing problem may exist even if the equipotential pair intersects—albeit at shallow angles. For example, FIG. 3 illustrates the intersection of two equipotentials, v and w formed from alternately biasing the touchscreen in two directions. The scale is magnified, such that the equipotentials are approximately linear over the region shown. The variances in the equipotentials, $\delta v$ and $\delta w$, due to noise and voltage-measurement uncertainty are also illustrated. Thus, the apparent touch position will have a displacement from the true touch position within this region. If v is measured as v±$\delta v$, and w as w±$\delta w$, then the possible errors in touch position are given by the four radial vectors from the v-w intersection. There are two unique magnitudes for the radial error depending upon the orientation of the equipotentials and signs of the voltage errors. The radial error can be calculated as:

$$Ec = \frac{|\delta v \cdot \vec{\nabla} w \pm \delta w \cdot \vec{\nabla} v|}{|\vec{\nabla} v \times \vec{\nabla} w|},$$

where the (negative of the) electric fields for the horizontal and vertical biases are written as $$\vec{\nabla} v = \frac{\partial v}{\partial x}\hat{i} + \frac{\partial v}{\partial y}\hat{j} \text{ and } \vec{\nabla} w = \frac{\partial w}{\partial x}\hat{i} + \frac{\partial w}{\partial y}\hat{j},$$

with $\hat{i}$ and $\hat{j}$ as unit vectors in the x and y directions, respectively. The maximum radial error can be selected according to the numerator for fixed $\delta v$ and $\delta w$. This corresponds to the correlated error $E_c$. Note that when the error voltages, $\delta v$ and $\delta w$, are consistently correlated, the radial error is large (as given by the formula) in two diagonal quadrants and smaller in the other two quadrants of a simple rectangular touchscreen. The relative correlated error at any point on the touchscreen can be evaluated by taking $\delta v = \delta w = \Delta V$ and determining $E_c/\Delta V$, where the sign of the numerator is always chosen to maximize the result. The above equation clearly shows that, if the two equipotentials intersect at a shallow angle or if a potential gradient is small, the error is large, which is the case for the poor-crossing regions in FIGS. 2a and 2b. A similar calculation can also be performed where the error voltages, $\delta v$ and $\delta w$, are uncorrelated or partially correlated. Such cases generally tend to show the same problems of uniqueness in the poor-crossing regions.

Various electrode configurations that are not circular, such as L configurations, can be visualized to decrease the size of these poor-crossing regions, but the problem still exists. One solution that has been successful to a large extent involves placing bands of intermediate resistivity (i.e., forming a frame) between the low resistivity electrodes themselves and surrounding the high resistivity touch region. In this manner, an effective way to transition from perfectly conductive electrodes situated at the four corners of the touchscreen and the touch region is achieved.

For example, the touchscreen 20 illustrated in FIGS. 1a and 1b comprises a resistive substrate 22 forming a touch region 24, four electrodes 26 disposed in the respective corners of the substrate 22, and an intermediate resistive band 28 (i.e., frame) formed between the touch region 24 and electrodes 26. In the case where the resistance of the touchscreen 24 is very large compared to the resistance of the resistive band 28, the equipotentials are linear as shown. In contrast, in a case where the resistance of the touchscreen 24 is not very large compared to the resistance of the resistive band 28, the equipotentials are non-linear. When designing the touchscreen 20, the ratio of the frame resistance over the substrate resistance, referred herein as the resistance ratio $\beta$, must be balanced between two countervailing factors—low-power consumption and linearity. This resistance ratio $\beta$ will play an important role in the discussion that follows. Before proceeding, let us define it carefully. First of all, $\beta$ is shorthand notation for either $\beta_x$ or $\beta_y$, which refer to the resistance ratio for x- and y-excitations respectively. Let $R_{left}$, $R_{right}$, $R_{top}$, and $R_{bottom}$, be the resistances of band segments 28a, 28b, 28c, and 28d respectively. These are the resistances of the band segments between the electrodes 26 under the hypothetical assumption that the band segments 28a, 28b, 28c, and 28d are electrically isolated from the touch region 24 and from each other. We define the band resistance in the x-direction as $r_x = R_{top} \| R_{bottom} = R_{top} * R_{bottom}/(R_{top} + R_{bottom})$, and the band resistance in the y-direction as $r_y = R_{left} \| R_{right} = R_{left} * R_{right}/(R_{left} + R_{right})$. Let the resistance of the hypothetically isolated touch region 24 in the x-direction be $R_x$ and the resistance in the y-direction be $R_y$. For example, if the touch region 24 has a uniform resistivity of $\rho_0$, a width W and a height H, then $R_x = \rho_0 * W/H$ and $R_y = \rho_0 * H/W$. The resistance ratios in the x- and y-directions are $\beta_x = r_x/R_x$ and $\beta_y = r_y/R_y$. These resistance ratios $\beta$ simultaneously provide a qualitative measure of power efficiency and a degree of non-linearity of the equipotential lines.

Specifically, if the resistance ratio $\beta$ is very low ($\beta \ll 1$), nearly perfect equipotentials are impressed onto the touchscreen—so good in fact that no topological or nonlinear mapping is required. However, it can also be mathematically proven that in the limit of small $\beta$, $\beta$ is the power efficiency of the touchscreen, namely the fraction of power consumed by current flow in the touch region in contrast to power consumed in the band segments. Unless the substrate resistivity is very large (greater than a few thousand ohms/square), such low $\beta$ designs lead to touchscreens of less than a few ohms resistance, drawing too much power. This is especially significant if the touchscreen is to be placed into hand-held, battery-powered devices, such as Personal Digital Assistants (PDAs). In general, for any given substrate resistivity, power consumption decreases with increasing resistance ratio β. If topological mapping is employed, however, the equipotential lines may be allowed to distort, thus allowing reduced power consumption. However, if the resistance ratio β becomes very high (β>>1), while the touchscreen power efficiency approaches 100%, the equipotentials tend to circle around the electrodes for both directions of excitation, as illustrated in FIG. 2a and 2b, thereby forming poor-crossing regions near the electrodes.

Even with elaborate topological mapping methodologies, the coordinates near the electrodes are difficult to determine uniquely. This problem could be addressed by increasing the effective border width of the touchscreen by simply masking off the perimeter region touch area. Excessive border width, however, is very undesirable from the point-of-view of compactness. Furthermore, some modern software applications with graphical user interfaces place much higher demands on touchscreen performance along the edges and corners of the touch region than was true ten or twenty years ago. Accuracy improvements in these corner regions are very desirable in order to reduce the maximum error on the touchscreen and to make its response more uniform.

There thus remains a need to improve the topological equivalence between the equipotential space and an external coordinate system near the electrodes of resistive touchscreens.

SUMMARY OF THE INVENTION

The present inventions are directed to a touch sensor that comprises a substrate having a resistive touch region. The substrate can either be transparent, for example, if the touch sensor is a touchscreen, or the substrate can be opaque, e.g., if display capability is not required. The touch sensor further comprises a set of electrodes electrically coupled to the touch region. The electrodes can either be mounted directly to the substrate or can be mounted to another structure, such as, a cover sheet, that comes into electrical contact with the touch region. In one preferred embodiment, the touch sensor is configured, such that the electrodes generate non-linear voltage gradients across the touch region. The touch sensor can also assume a capacitive architecture, in which case, a dielectric coating can be applied to the substrate over the resistive touch region.

The touch sensor further comprises a resistive band that frames the touch region. The resistive band is an intermediate resistive band in that it has a resistivity that is between the resistivity of the electrodes and the resistivity of the touch region. The resistive band is continuous or quasi-continuous along at least a portion of its length, preferably the entire length of the band. In this manner, the outer edges of the workable touch region extends all the way, or very close, to the band, thereby maximizing the effective touch region.

In accordance with a first aspect of the present inventions, the touch sensor comprises band segments, at least one of which has a linear resistance that varies along its length. For example, each band segment can have a linear resistance that is smallest in the center region of the band segment, but increases along the length of the band segment towards the ends of the band segment. Computer simulations have shown that the electrical field strength in the corners is increased, thereby reducing the errors in these corners.

In accordance with a separate second aspect of the present inventions, a dynamic touch sensor system is provided. The touch sensor system comprises a touch sensor that generates touch information in response to a touch.

The touch sensor also generates measurable information indicative of a given electrical characteristic in the touch sensor. The touch sensor has an intermediate resistive band that has a substantially non-uniform linear resistance. The linear resistance of the band can be varied in any one of a variety of manners, including varying the linear resistance within a band segment, as described above.

The touch sensor system further comprises control electronics coupled to the electrodes for receiving the touch information and measurable information from the touch sensor. The control electronics use an algorithm (such as, e.g., a mapping algorithm) to determine the coordinates of the location of the touch in the touch region based on the touch information, and modifies the algorithm based on the measurable information.

Although the present invention should not be so limited in its broadest aspects, the use of an appropriate intermediate resistive band, especially if it has at least one band segment with a non-uniform linear resistance, will improve the topological equivalence within the corner regions, thereby making the algorithm modification process simpler.

In accordance with a separate third aspect of the present inventions, at least one band segment comprises a continuous resistive background material and an array of electrically conductive elements disposed along at least a lengthwise portion of the band segment(s) over the background material. The conductive elements have a resistivity that is lower than the resistivity of the background material. Although the present invention should not be so limited in its broadest aspects, the addition of the conductive elements allows the linear resistance of the band to be more easily controlled and manufactured.

In one preferred embodiment, the conductive elements are generally arranged parallel to each other, and each extends perpendicularly relative to the lengthwise band portion(s). The background material can be topologically divided into resistive segments. In this case, each electrically conductive element has a fractional width defined by the dimension of the conductive element along the respective lengthwise portion over the sum of the dimension of the corresponding resistive segment along the lengthwise portion and the dimension of the conductive element along the lengthwise portion. In order to provide better control of the linear resistance of the band, the fractional width of electrically conductive elements is substantially less than unity, preferably less than 0.9 and more preferably, within the range of 0.2 to 0.8, depending upon the resistivity of the background material and the desired resistance ratio β. The fractional width of electrically conductive elements can either be uniform, in which case, the linear resistance of the band will generally not vary, or can vary between the electrically conductive elements, in which case the linear resistance of the band will vary along its length. Additionally, the linear resistance may be controlled by varying the width of the band perpendicularly relative to the lengthwise portion. To maintain the quasi-continuous nature of the band, the spacing between conductive elements is small compared to the lengthwise band segment, preferably less than 2 percent, and more preferably less than 1 percent, of the lengthwise band segment.

In one preferred embodiment, the touch region is formed by the background material, which simplifies the manufacturing process. If the resistance ratio, is relatively low, however, the background material can have a resistivity that is between the resistivity of the electrodes and the resistivity of the touch region, so that the fractional width of the electrically conductive elements can be kept well below unity.

In accordance with a separate fourth aspect of the present inventions the resistive touch region has a non-rectangular geometry. The non-rectangular geometry, can be, e.g., triangular, pentagonal, or hexagonal. The non-rectangular geometry can either be planar or non-planar. A set of electrodes is electrically coupled to the touch region for generating non-linear voltage gradients over the touch region. Notably, many touch regions with non-rectangular geometries will have worse topological equivalence than that in touch regions with rectangular geometries. As such, the use of an intermediate resistive band can increase this topological equivalence. The band may have a substantially uniform linear resistance for ease of manufacturability, or if greater improvement in topological equivalence is desired, the band can have a substantially non-uniform resistance. As with rectangular sensors, the resistance ratio can be selected to balance the needs of power efficiency and ease of topological mapping.

BRIEF DESCRIPTION OF THE DRAWINGS

The drawings illustrate the design and utility of preferred embodiment(s) of the present invention, in which similar elements are referred to by common reference numerals. In order to better appreciate the advantages and objects of the present invention, reference should be made to the accompanying drawings that illustrate the preferred embodiment(s). The drawings depict only an embodiment(s) of the invention, and should not be taken as limiting its scope. With this caveat, the preferred embodiment(s) will be described and explained with additional specificity and detail through the use of the accompanying drawings in which:

FIG. 5 is a plan view of a touchscreen used in the touchscreen system of FIG. 4;

FIG. 15 is a plan view of yet still another touchscreen that can be used in the touchscreen system of FIG. 4; and FIG. 16 is a perspective view of a sphere that has been tiled within a multitude of touch sensors.

DETAILED DESCRIPTION OF THE PREFERRED EMBODIMENTS

Figure 4:
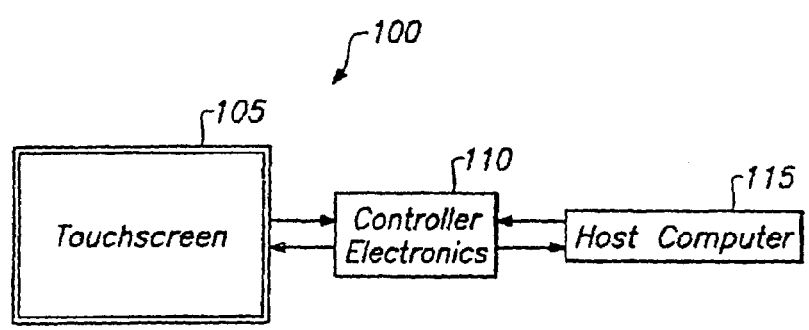
FIG. 4 is a block diagram of a touchscreen system constructed in accordance with one embodiment of the present invention.

Referring to FIG. 4, a resistive touchscreen system 100 constructed in accordance with a preferred embodiment of the present invention is described. The touchscreen system 100 generally comprises a touchscreen 105 (i.e., a touch sensor having a transparent substrate), controller electronics 110, and a display (not shown). The touchscreen system 100 is typically coupled to a host computer 115. Generally, the controller electronics 110 sends excitation signals to the touchscreen 105 and receives analog signals carrying touch information from the touchscreen 105. Specifically, the controller electronics 110 establishes a voltage gradient across the touchscreen 105. The voltages at the point of contact are representative of the position touched. The controller electronics 110 digitizes these voltages and transmits these digitized signals, or touch information in digital form based on these digitized signals, to the host computer 115 for processing.

Referring now to FIG. 5, the touchscreen 105 comprises a substrate 125 having a touch region 130 that is formed by permanently applying a uniform resistive layer to one surface of the substrate 125. Generally, orthogonal voltage gradients will be alternately applied over the touch region 130 of the touchscreen 105 via electrodes 135. In the illustrated embodiment, the touchscreen system 100 employs a 5-wire architecture, and thus, leads (not shown) connect each of the four corner electrodes 135 to the controller electronics 110 and a fifth lead (not shown) connects a coversheet to the controller electronics 110.

The touchscreen 105 further comprises a band 140 of resistive material that is disposed on the perimeter of the resistive substrate 125 in order to frame the touch region 130. The resistive band 140 has an intermediate resistivity between the low resistivity electrodes 135 and the high resistivity touch region 130, so that the adverse effect caused by the poor-crossing regions adjacent the electrodes 135 is reduced. Preferably, the selection of the resistive material for the band 140, as well as other resistive bands described hereinafter, results in a resistance ratio β between 0.1 and 10.

Preferably, the resistive band 140 extends continuously along the perimeter of the touch region 130. The electrodes 135 are suitably electrically coupled to the substrate 125 at the corners of the resistive band 140. In this manner, the resistive band 140 is functionally divided by the electrodes 135 into four band segments 145a–d (left, right, top, and bottom), each of which is continuous and borders one side of the rectangular touch region 130. Further details regarding the use of conductive bands of intermediate resistivity are described in U.S. patent application Ser. No. 09/262,909, now U.S. Pat. No. 6,650,319, which is expressly incorporated herein by reference. As will be described in further detail below, the resistive band 140 has additional unique qualities that operate to further reduce the poor-crossing problem.

Figure 1A:
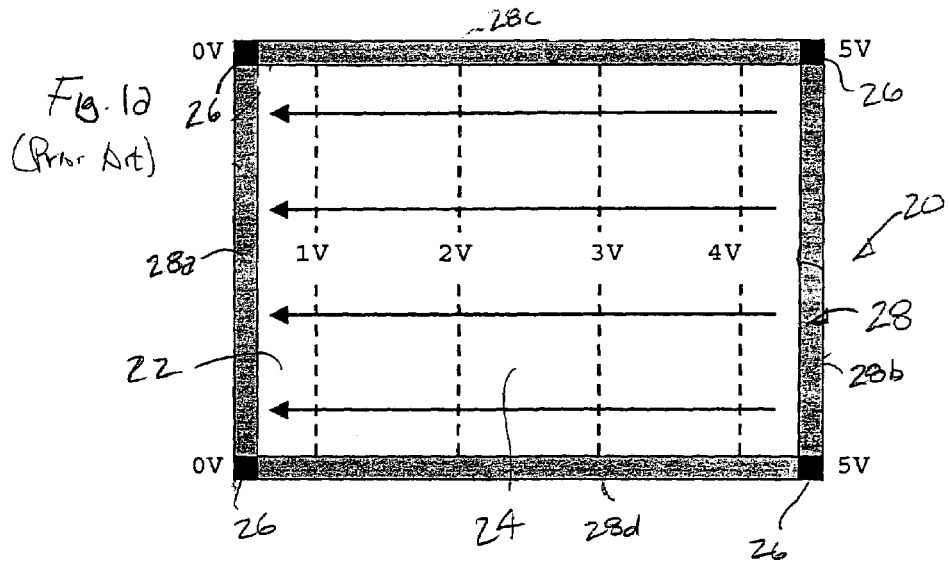
FIG. 1a is a plan view of a prior art touchscreen operated to provide a voltage gradient in the x-direction.
Figure 1B:
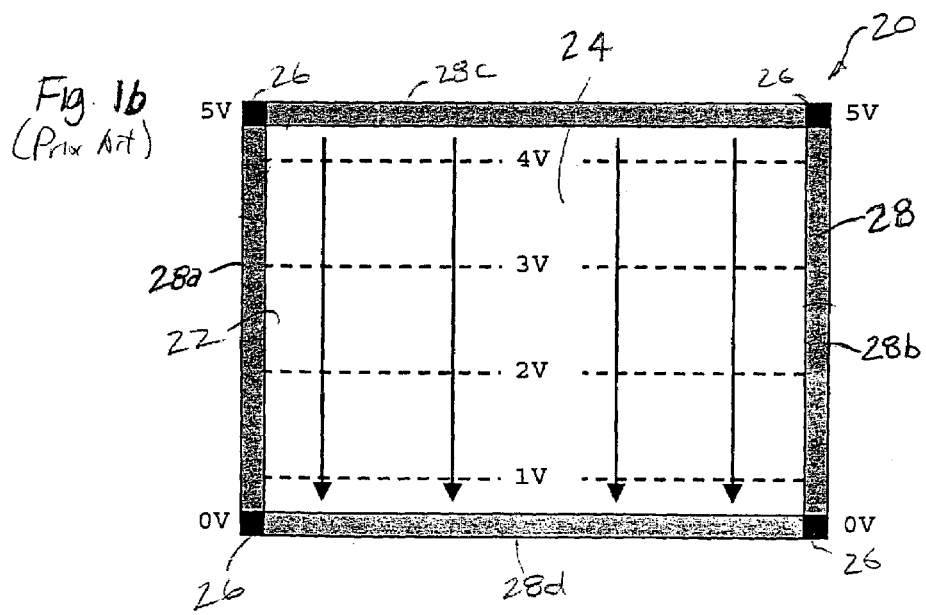
FIG. 1b is a plan view of a prior art touchscreen operated to provide a voltage gradient in the y-direction.
Figure 2A:
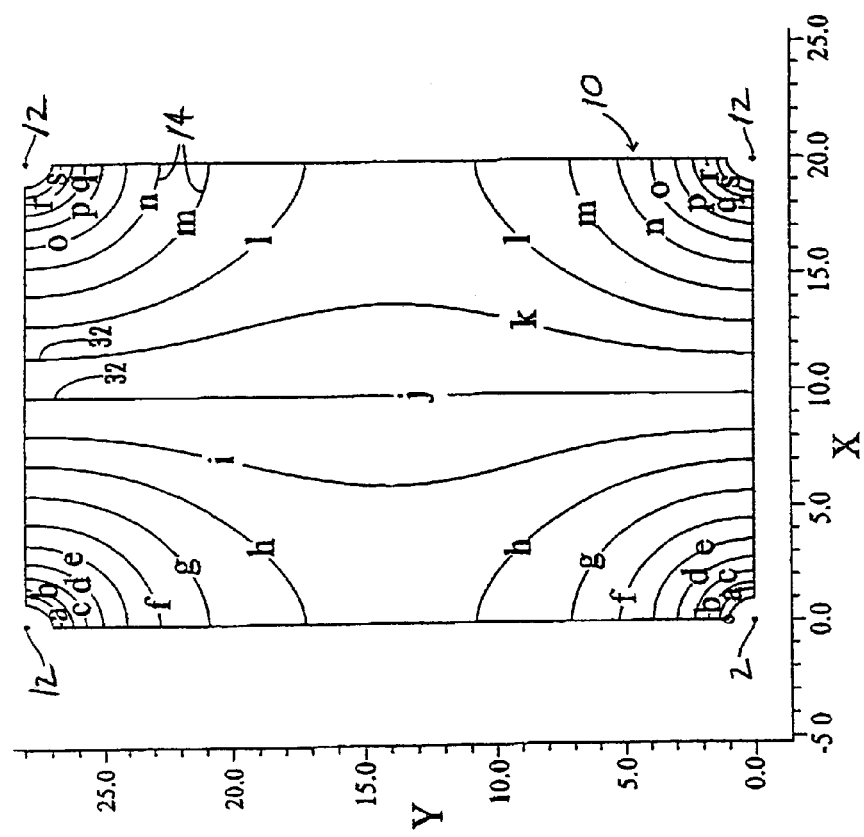
FIG. 2a is a computer simulation of a prior art touchscreen that has been biased to provide equipotential lines that generally run in the y-direction and that provides a distorted x-coordinate measurement.
Figure 2B:
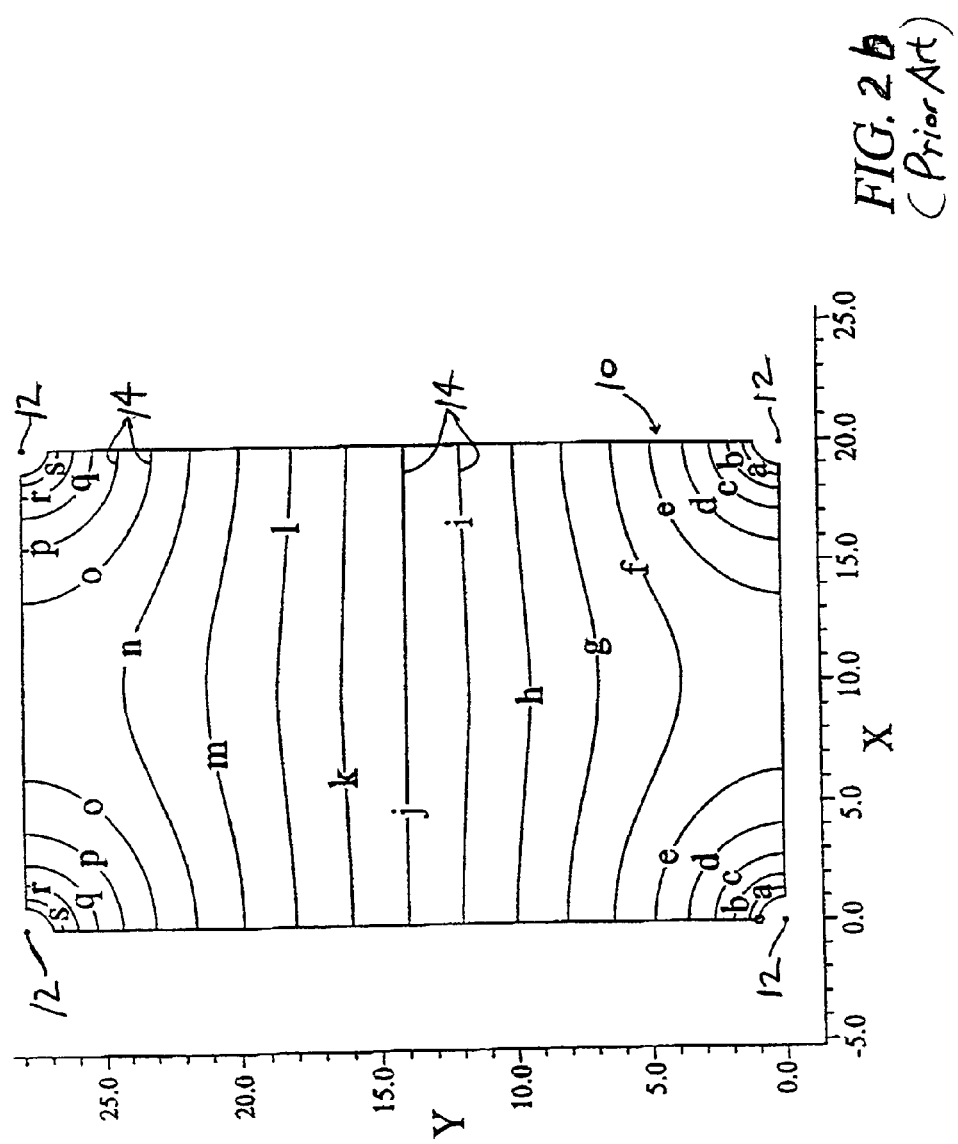
FIG. 2b is a computer simulation of a prior art touchscreen that has been biased to provide equipotential lines that generally run in the x-direction and that provides a distorted y-coordinate measurement.
Figure 3:
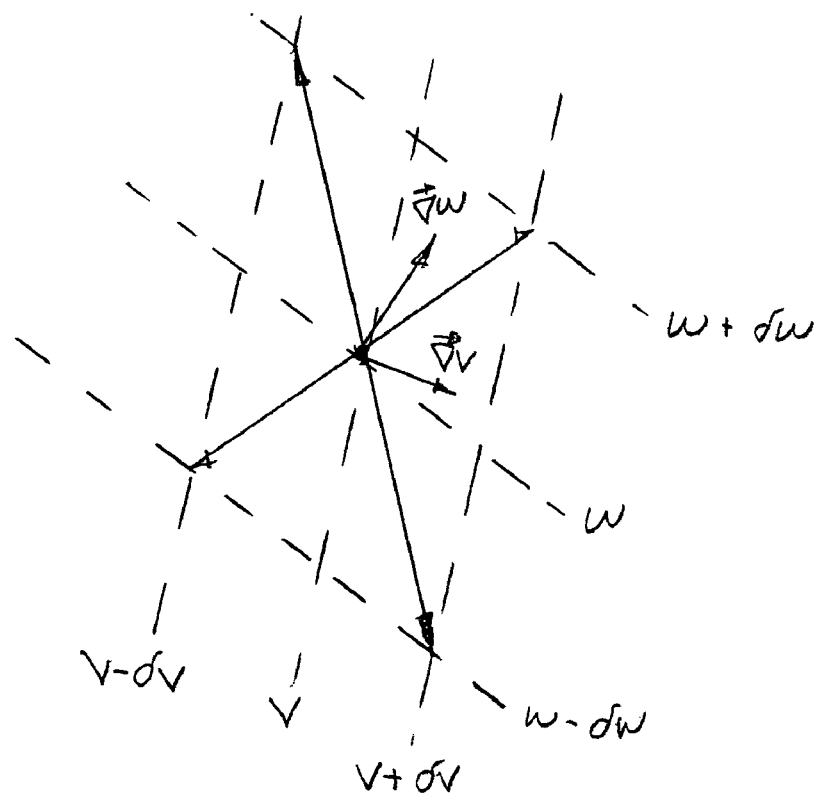
FIG. 3 is a diagram of the intersection of two equipotential lines, taking into account measurement errors.

In accordance with typical 5-wire architectures, x- and y-excitations are alternately applied to the touchscreen substrate 125 via the electrodes 135. Specifically, an x-excitation is generated by passing current through the touch region 130 injected at the right band segment 145b and collected at the left band segment 145a. As a result, a voltage gradient is generally created along the x-axis (similar to that shown in FIG. 2a). A y-excitation is generated by passing current through the touch region 130 injected at the top band segment 145c and collected at the bottom band segment 145d. As a result, a voltage gradient is generally created along the y-axis (similar to that shown in FIG. 2b). Although the controller electronics 110 can obtain touch information from a 5-wire resistive touchscreen via the voltage excitation described above, current injection can also be used with similar results. Further details regarding 5-wire resistive touchscreens are found in U.S. Pat. Nos. 4,220,815, 4,661,655, 4,731,508, 4,822,957, 5,045,644, and 5,220,136. The touchscreen system 100 can alternatively employ a 9-wire or capacitive architecture. These and other technologies are described in U.S. patent application Ser. No. 09/705,383, now U.S. Pat. No. 6,593,916, which is expressly incorporated herein by reference.

The controller electronics 110 can map the non-linear equipotential space onto the Cartesian space in any one of a variety of manners. For example, it can be shown that two polynomials can be constructed to accurately map intersections of the equipotentials to unique coordinates. Given two potentials (v and w), measured as previously described, the following mapping polynomials can be used to transform a potential pair [v(x,y), w(x,y)] into Cartesian coordinates x and y:

$$x(v, w) = \sum_k A_k v^{lk} w^{mk}; \quad y(v, w) = \sum_k B_k v^{mk} w^{lk},$$

where the sum is taken over all the terms k of the polynomials with coefficients $A_k$ and $B_k$. The degree of the polynomials for a specified accuracy is dependent upon the uniformity of the equipotential distributions. Alternatively, a look-up-table (LUT) that stores a large array of pre-defined x,y points corresponding to the field of points in the [v(x,y), w(x,y)] can be employed. More alternatively, interpolative mapping can be used. Further details regarding these and other mapping techniques are disclosed in U.S. patent application Ser. No. 09/262,909, now U.S. Pat. No. 6,650,319.

Whichever mapping type is used, it has been discovered that a resistive band with uniform linear resistance along its length, although generally improving the crossover of the equipotential lines at the corners of the touch region (i.e., adjacent the electrodes), may still result in equipotential lines that disadvantageously intersect at shallow angles in these corner regions. As previously described, shallow crossover of equipotentials can adversely affect the coordinate resolution in this region.

It has been discovered that the poor-crossing problem can be ameliorated by providing a band that has a linear resistance that varies along at least one of the band segments 145. In the embodiment illustrated in FIG. 5, each of the band segments 145 has a varying width along its length (i.e., the dimension in the same plane but perpendicular to the length of the respective band segment). Specifically, each band segment 145 is tapered in that it has a center region 150 that has a uniform width, and opposing tapered regions 155 that have widths that decrease from the edge of the center region 150 to the corners of the touch region 130. This improves the resolution of the equipotential lines in the corner regions, as compared to touchscreens with resistive bands of uniform width.

Figure 6A:
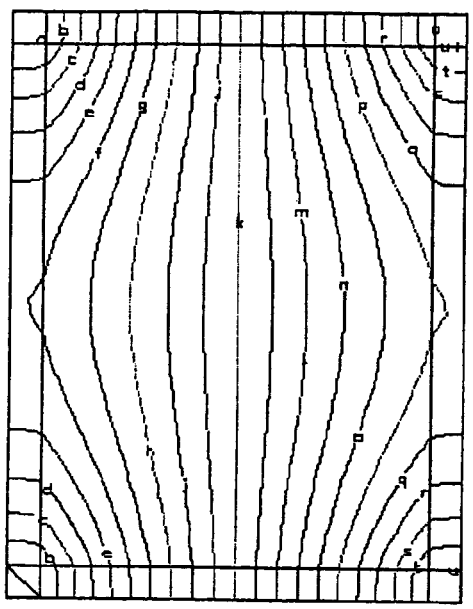
FIG. 6a is a computer simulation of a prior art touchscreen that has been biased to provide equipotential lines that generally run in the y-direction.
Figure 6B:
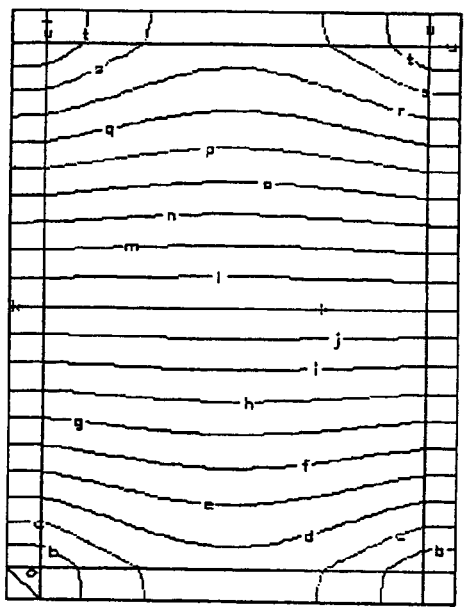
FIG. 6b is a computer simulation of a prior art touchscreen that has been biased to provide equipotential lines that generally run in the x-direction.
Figure 7A:
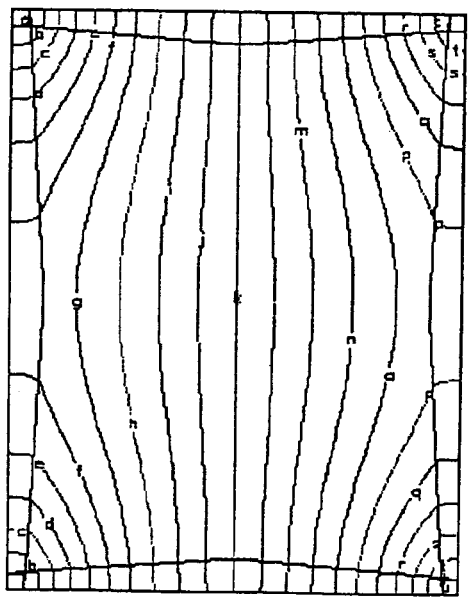
FIG. 7a is a computer simulation of the touchscreen of FIG. 5, which has been biased to provide equipotential lines that generally run in the y-direction.
Figure 7B:
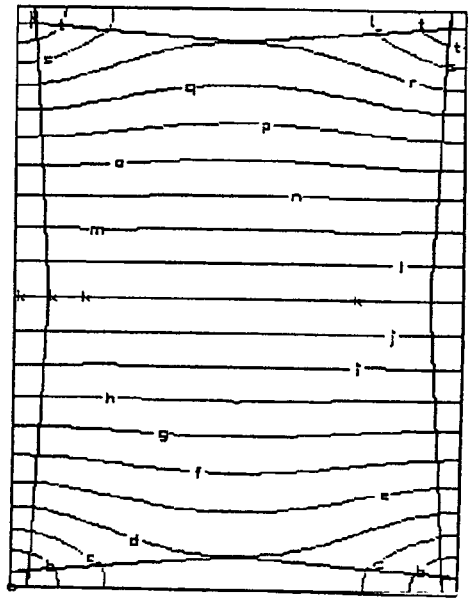
FIG. 7b is a computer simulation of the touchscreen of FIG. 5, which has been biased to provide equipotential lines that generally run in the x-direction.

For example, FIGS. 6a and 6b illustrate equipotential distributions within a touchscreen (with uniformly resistive band segments) that has been alternately biased horizontally (FIG. 6a) and vertically (FIG. 6b) by application of voltages at the corner electrodes. FIGS. 7a and 7b illustrate equipotential distributions within a touchscreen (with tapered resistive band segments) that has been alternately biased horizontally (FIG. 7a) and vertically (FIG. 7b) by application of voltages at the corner electrodes. The equipotential distributions illustrated in FIGS. 6 and 7 were generated using computer simulations with programs that solve Laplace's equation for specified boundary conditions. In both cases illustrated in FIGS. 6 and 7, the outside dimensions of the touchscreen are 2.7×3.6 inches, and the touch region has a resistivity of 1000 ohms/square. The simulated touchscreen of FIG. 6 can be considered to be uniform in that the linear resistance along each band segment is uniform, whereas the simulated touchscreen of FIG. 7 can be considered to be non-uniform in that the linear resistance along each band segment is not uniform.

For purposes of comparison, the dimensions of the bands in the respective uniform and non-uniform touchscreens were dimensioned and given resistivities, such that they would have the same average power consumption. Specifically, the resistive band of the uniform touchscreen is 0.2 inches wide and has a resistivity of 214 ohms/square. The resistive band of the non-uniform touchscreen has a resistivity of 139 ohms/square. For each band segment in the non-uniform touchscreen, the center region is 0.2 inches wide, and the smallest width of the tapered region is 0.1 inches. The length of each of the tapered regions for the left and right band segments is 1.714 inches, and the length of each of the tapered regions for the top and bottom band segments is 1.286 inches.

Figure 8:
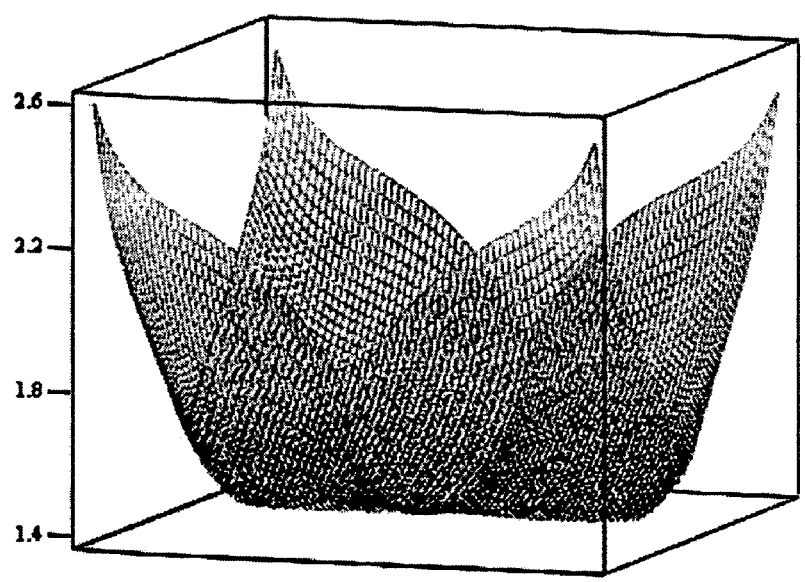
FIG. 8 is a three-dimensional plot showing the mapping error as a function of x-y coordinates of the computer simulated touchscreen of FIGS. 6a and 6b.
Figure 9:
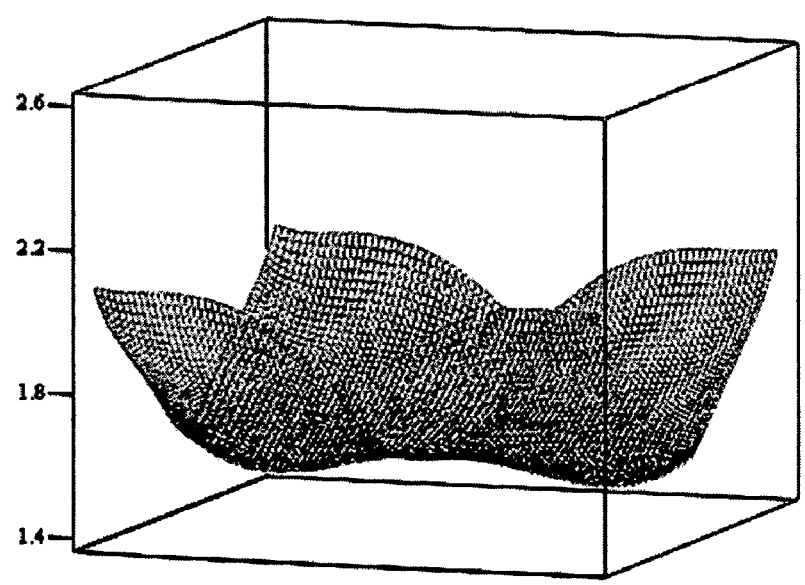
FIG. 9 is a three-dimensional plot showing the mapping error as a function of x-y coordinates of the computer simulated touchscreen of FIGS. 7a and 7b.

Even though the uniform and non-uniform touchscreens consume the same average power within 0.1 percent, as can be seen from the plots illustrated in FIGS. 8 and 9, the relative error $E_c/\Delta V$ in the corner regions has been improved. (As shown in FIGS. 8 and 9, the relative $E_c/\Delta V$ is the correlated error relative to the correlated error for a touchscreen with perfectly linear equipotential lines.) That is, the uniform touchscreen of FIG. 6 has a maximum relative error of 2.62, whereas the non-uniform touchscreen of FIG. 7 has a reduced maximum relative error of 2.1.

Table 1 sets forth the correlated error for the uniform and non-uniform touchscreens relative to the correlated error for a touchscreen with perfectly linear equipotential lines. Table 1 also sets forth the fitting errors in inches using five- and nine-term mapping polynomials for the touchscreens with no error otherwise. Smaller fitting errors indicate that the equipotentials are a better fit and also indicate less nonlinearity at least in some region of the touchscreen. Though the external resistance of the respective touchscreens, and thus power consumption, are the same, the maximum correlated error has improved by 20 percent. Additionally, the maximum and RMS fitting errors for the five- and nine-term polynomial mapping have improved significantly.

TABLE 1

Calculated Characteristics of Uniform and Non-Uniform Touchscreens in FIGS. 6 and 7.

| | Resistance | | Resistance Ratio | | Ec/ΔV | | 5 Terms | | 9 Terms | |
|---|---|---|---|---|---|---|---|---|---|---|
| | X | Y | βx | βy | Max | RMS | Max | RMS | Max | RMS |
| Uniform (FIG. 6) | 583 | 850 | 1.712 | 1.231 | 2.62 | 1.71 | 0.077 | 0.013 | 0.015 | 0.002 |
| Non-Uniform (FIG. 7) | 593 | 834 | 1.46 | 1.049 | 2.10 | 1.72 | 0.054 | 0.011 | 0.008 | 0.001 |

The linear resistance of each band segment of a touchscreen can be varied in manners other than by varying the width along the length of the band segment. For example, each band segment may have a uniform width, but have a higher conductivity in the center that tapers to lower conductivities towards the opposing ends of the band segment, i.e., near the corners of the touch region. This can be accomplished, for example, by adjusting the thickness of the band segment (i.e., the dimension perpendicular to the plane of the touchscreen substrate 125) along its length.

Figure 10:
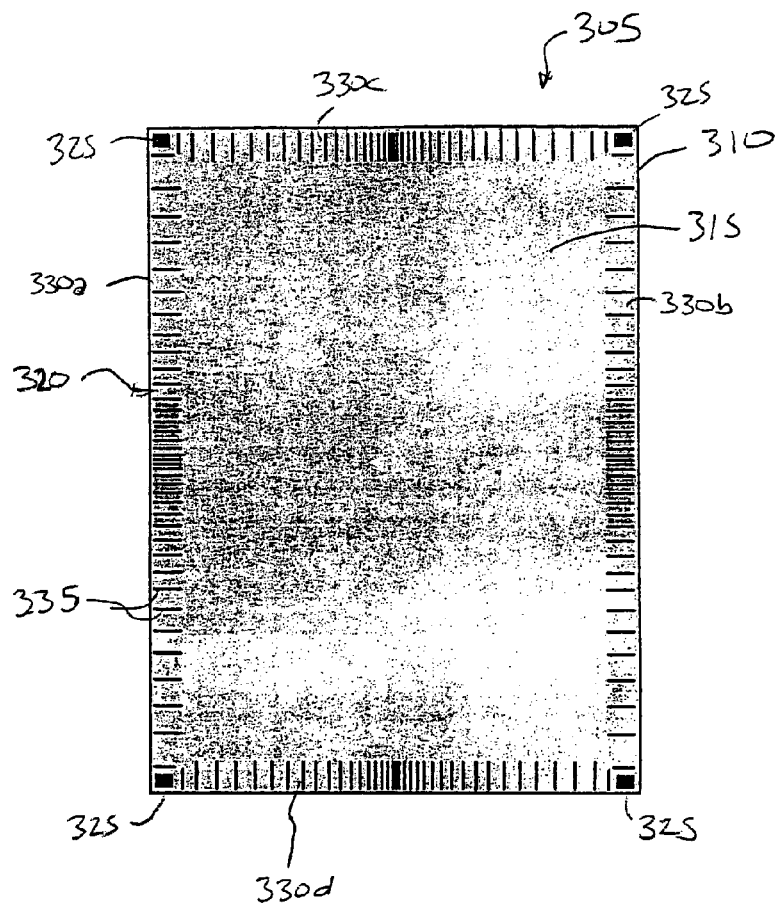
FIG. 10 is a plan view of still another touchscreen that can be used in the touchscreen system of FIG. 4.

Alternatively, the linear resistance along at least a lengthwise portion of each band segment can be varied by arranging an array of highly conductive elements on the band segment and adjusting the size and spacing of the conductive elements to provide the desired conductance changes. For example, FIG. 10 illustrates a touchscreen 305 that comprises a resistive substrate 310 with a touch region 315, and a resistive band 320 that is disposed on the perimeter of the resistive substrate 310 in order to frame the touch region 315. The touchscreen 305 further comprises electrodes 325 that functionally divide the resistive band 320 into four band segments 330a–d around the perimeter of the resistive substrate 310. Each segment 330 comprises an array of highly conductive elements 335, with the resistive material of the segment 330 forming a resistive background for the conductive elements 335. In this case, the resistive material that coats the substrate 310 (for example indium-tin-oxide (ITO)) provides a part of the conducting path of the resistive band 320. The linear resistance of each band segment 330 can be controlled by varying the width, length, thickness, and/or spacing of the conductive elements 335. Alternatively, rather than varying the linear resistance within a band segment, conductive elements can be used to provide different uniform linear resistances between band segments.

The use of the conductive elements 335 to control the linear resistance of the resistive band 320 simplifies manufacturing and manufacturing controls. This is because the need to control the precise resistivity of either the substrate or band material is greatly reduced. A common variation of resistivity in the substrate resistive coating in the touch region and between conductive elements 335 causes an overall change in the resistance of the touchscreen 305, but does not alter the shape of the equipotential lines. The principle requirement is that deposition of the highly conductive material on the touchscreen (e.g., by lithography) should be accurately controlled to provide predictable fields for touch location.

In order to provide the desired resistance of the resistive band 320, the electrical behavior of the resistive band 320 must be known, given a selected size and spacing of the conductive elements, as well as the resistivity of the substrate coating material. Notably, the resistive band 320 exhibits an anisotropic electrical behavior in that the effective conductivity along the lengths of the conductive elements 335 is high, while the effective conductivity perpendicular to the lengths of the conductive elements 335 is moderate.

Figure 11:
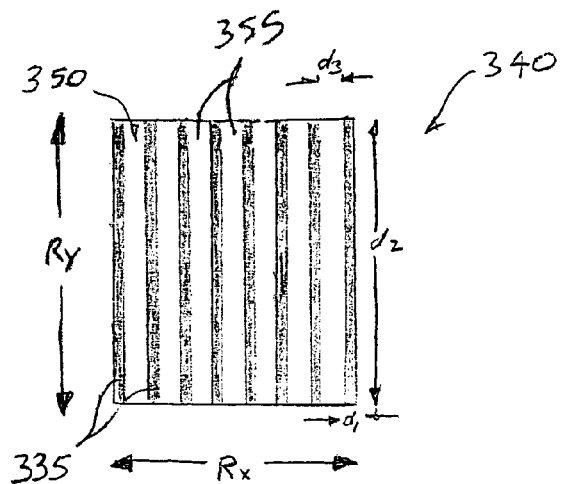
FIG. 11 is a plan view of a portion of an exemplary resistivity band.

To illustrate this point, reference can be made to FIG. 11, which illustrates an exemplary length of a resistive band 340 having an array of electrically conductive elements 335 on a resistive background 350. In this case, the conductive elements 335 are shown as being uniformly spaced for purposes of simplicity. Each of the conductive elements 335 has a dimension $d_1$ (representing the width of the conductive element) extending along the x-direction, and a dimension $d_2$ (representing the length of the conductive element) extending along the y-direction. The resistive background 350 can be functionally divided into resistive segments 355, each of which has a dimension $d_3$ (representing the width the respective segment 355) extending along the x-direction. Assuming that the conductive elements 335 are long compared to their separation, the resistance of the band per unit length in each direction can be approximated by $\rho_x = f\rho c + (1-f)\rho$;

$$\rho y = \frac{1}{\frac{f}{\rho c} + \frac{1-f}{\rho}},$$

where f is the fractional width of the conductive elements 335 (i.e., the dimension $d_1$ of a conductive element 335 divided by the sum of the dimension $d_3$ of an adjacent resistive segment 355 and the dimension $d_1$ of the conductive element 335), $\rho_c$ is the resistivity of the conductive element 335, and $\rho$ is the resistivity of the resistive background 350. If the value of f is very close to one (as is the case when the desired value of $\rho_x$ is much lower than $\rho$), and the sum of the dimensions $d_1$ and $d_3$ is kept small enough to approximate a quasi-continuous medium, then the widths of the resistive segments 355 can become very small and subject to large percentage manufacturing variations. Of significance, reasonable values of the fractional width f of the conductive element 335 make it easier to control the resistance along the resistive band 340. Thus, the fractional width f is preferably maintained well below unity, e.g., below 0.95, and preferably within the range of 0.1 to 0.9. In the resistive band 340 illustrated in FIG. 11, the fractional width f is approximately 0.35.

Notably, the effective resistivity of the resistive background 350 is reduced by a factor 1−f if the conductive elements 335 have low resistance. For ratios of the touchscreen width to the band-segment width of 0.1 and $\beta_x$ from 0.5 to 2, the fractional width f drops from 0.9 to 0.6, assuming the resistive background 350 is coextensive with the resistive material of the touch region 315. If the resistive background 350 has a lower resistivity than the resistive material that forms the touch region 315, the preferred fractional width f will drop even lower, as explained in further detail below.

When applied to a touchscreen, the equipotentials over the touchscreen can be calculated in a continuum limit if the number of conductive elements 335 is increased, while maintaining the same fractional width f. In this case, the resistive band 340 becomes effectively homogenous, although anisotropic. Despite this anisotropy, standard finite-element-difference methods can then be used to calculate the equipotentials. (A useful computational trick is to transform the dimensions of the anisotropic resistive band 340 into an equivalent isotropic case, wherein the equivalent band width would be reduced by a factor of $\sqrt{(\rho_y/\rho_x)}$, and the effective conductivity of the equivalent isotropic resistive band becomes $\sqrt{(\rho_y\rho_x)}$.

It should be noted that although the conductive elements 335 are technically discrete elements, the spacing between the conductive elements 335 as compared to the length of the band segments 330 is relatively small, resulting in a resistive band that is electrically quasi-continuous. For the purposes of this specification, a portion of the resistive band segment 330 is quasi-continuous if the width of the resistive segments 355 within that portion (i.e., the spacing between the adjacent conductive elements 335) is less than 2% of the length of the corresponding band segment 330. In the preferred embodiment, the width of the resistive segments 355 is less than 1% of the length of the corresponding band segment 330.

The significance of having a quasi-continuous band in a touchscreen is that the edges of the workable touch region will be spaced from the resistive band a very small distance, roughly equal to the periodic spacing ($d_1+d_3$) between conductive elements or perhaps 1 mm, thereby providing a greater workable touch region as compared to a dimensionally equivalent touchscreen with discrete peripheral resistors. Of course, the use of a continuous resistive band, such as the resistive bands used by the previously described touchscreens 105 and 205, as well as the touchscreens described in U.S. patent application Ser. No. 09/262,909, now U.S. Pat. No. 6,650,319, will result in a touchscreen with a workable touch region that extends all the way to the resistive band, providing a maximized touch region.

If a resistive band is to have a non-uniform linear resistance, such as the resistive band 320 illustrated in FIG. 10, the fractional width f of the electrically conductive elements 335 will not be uniform in contrast to the resistive band illustrated in FIG. 11. Instead, the fractional width f of the conductive elements 335 will vary along the length of the resistive band 320 in order to control the local effective resistivity and anisotropy of the resistive band 320. Accordingly, this variance must be taken into account when calculating the resistance along the resistive band 320.

For a resistive band with a uniform linear resistance, the fractional width f needed to achieve a desired touchscreen linearity (gauged by the resistance ratio $\beta$) is determined by the resistivity $\rho$ of the resistive background, assuming that $\rho<<\rho_c$. For a low-power (high-resistance) touchscreen, the conductive elements can be applied directly to the resistive substrate having a relatively high resistivity $\rho$. As long as the resistance ratio $\beta$ is relatively high, the fractional width f can be maintained at a relatively low value, thereby allowing the resistance of the resistive band to be more precisely controlled.

Figure 12:
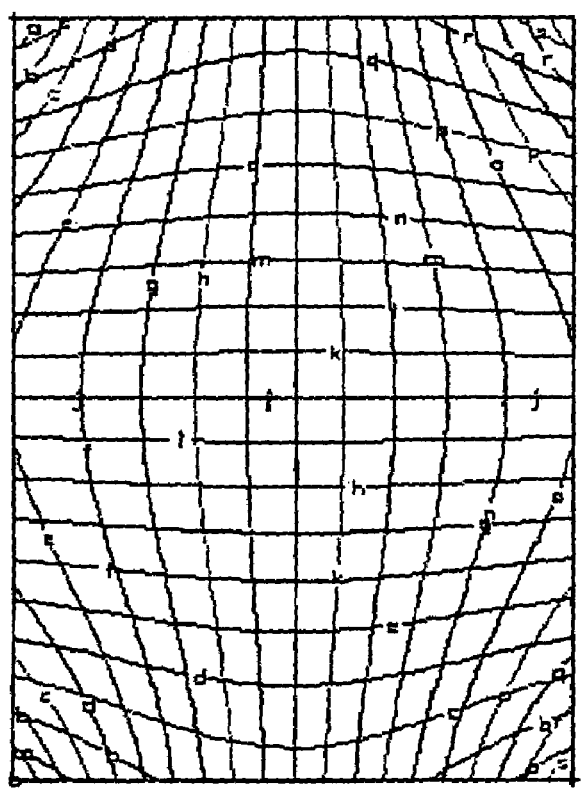
FIG. 12 is a computer simulation of the touchscreen of FIG. 10, which has been horizontally and vertically biased to provide equipotential lines that generally run in the x- and y-directions.

For example, FIG. 12 illustrates horizontally and vertically biased equipotential distributions on a computer simulated touchscreen These equipotential distributions were generated using computer simulations with programs that solve Laplace's equation for specified boundary conditions. The touchscreen is 2.7"×3.6", the resistive substrate has a resistivity of 1000Ω/square, and the resistance ratio $\beta$ is 2.8. The resistive band has a 0.2" width and is composed of uniformly spaced, parallel conductive elements disposed along the periphery of the resistive substrate. The fractional width f of the conductive elements is 0.8, giving a 588Ω× 858Ω touchscreen resistance using an equivalent continuous isotropic resistive band.

It should be noted that, for touchscreens in which very narrow borders are desired, a low resistance ratio $\beta$ may be difficult to achieve by applying the conductive elements onto the material from which the resistive substrate is composed, since the fractional width f of the conductive elements would approach unity, thus making the precise control of the resistance difficult. In this case, the resistive band can be further composed of a continuous material having an intermediate resistivity between that of the electrodes and the touch region—similar to the resistive band 140 illustrated in the touchscreen 105, as well as the resistive bands described in U.S. patent application Ser. No. 09/262,909, now U.S. Pat. No. 6,650,319. The provision of the underlying intermediate resistive material thus allows the fractional width f of the conductive elements to be lowered, e.g., to a value within the range from 0.2 to 0.8.

It should also be noted that the conductive elements need not necessarily be continuous themselves, i.e., formed of linear lines. Alternatively, the conductive elements may be composed of a series of dots, dashes, or any other shape that provides greater conductivity along the width of the band, as compared to the conductivity along the length of the band. Also, although each band segment 330 is illustrated as being quasi-continuous along its entire length, less than all of the band segments 330 can be quasi-continuous (e.g., just the top and bottom band segments 330c and 330d), or less than the entire lengths of the band segments 330 can be quasi-continuous.

The use of resistive bands of intermediate resistivity material lends itself well to touchscreens with non-rectangular geometries. In particular, it is difficult to generalize the current resistive touchscreen technologies, which have been developed in Cartesian space, to surfaces with arbitrary geometry, which cannot be easily placed in Cartesian space. For example, the application of uniform voltage gradients (i.e., linear equipotential lines) is limited to rectangular touchscreens, in which case, the design of non-rectangular touchscreens necessarily invokes non-linear architectures. Due to their odd geometries, these non-rectangular touchscreens will, in many cases, suffer non-linearity problems greater than those of rectangular touchscreens. For non-rectangular geometries, we define a resistance ratio $\beta$ for each side or band segment equal to the resistance of that side or band segment divided by the resistivity (Ohms/square) of the touch region.

Figure 13:
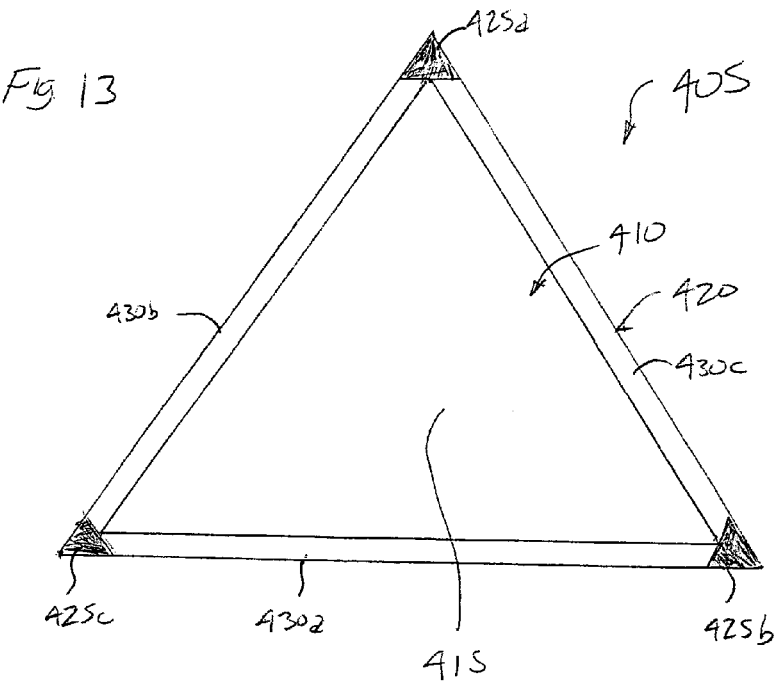
FIG. 13 is a plan view of yet another touchscreen that can be used in the touchscreen system of FIG. 4.

FIG. 13 illustrates a touchscreen 405 with a triangular geometry. The touchscreen 405 comprises a resistive substrate 410 with an equilateral triangular perimeter and touch region 415, and a resistive band 420 that is disposed on the perimeter of the substrate 410 in order to frame the touch region 415. The touchscreen 405 further comprises three electrodes 425a–c that are respectively located in the three corners of the substrate 410 in electrical communication with the touch region 415. The resistive band 420 is divided into three band segments 430a–c by the three electrodes 425a–c. Like the previously described resistive bands, the resistive band 420 has an intermediate resistivity between the low resistivity electrodes 425a–c and the high resistivity touch region 415.

Three voltage excitations can be applied to the touchscreen 405 by applying a voltage to one of the electrodes 425 and grounding the remaining two electrodes 425. Specifically, a first voltage gradient can be generated by applying a voltage to electrode 425a, while grounding electrodes 425b and 425c. A second voltage gradient can be generated by applying a voltage to electrode 425b, while grounding electrodes 425a and 425c. A third voltage gradient can be generated by applying a voltage to electrode 425c, while grounding electrodes 425a and 425b. In a similar manner described above with respect to the touchscreen 105, the intersections of two equipotential lines can then be mapped to unique coordinates, with a third intersecting equipotential line providing redundancy to improve the accuracy of the mapping process.

Alternatively, only two voltage excitations are applied to the touchscreen 405 by applying a voltage to one of the electrodes 425 and grounding the remaining two electrodes 425, and then applying a voltage to another of the electrodes 425 and grounding the remaining two electrodes 425. Even more alternatively, three voltage excitations can be applied to the touchscreen 405, but only two of the three voltage gradients will be used, the selection of which will depend on which corner region is to be mapped. That is, the two voltage gradients that provide the best accuracy in a corner region will be the voltage gradients that are selected to map that corner region. For each of the other two corner regions, two voltage gradients, one of which may not be a voltage gradient that was used to map the first corner region, can be selected. Of course, the remaining voltage gradient that has not been selected can be used to provide redundancy to improve the accuracy of the mapping process.

Figure 14:
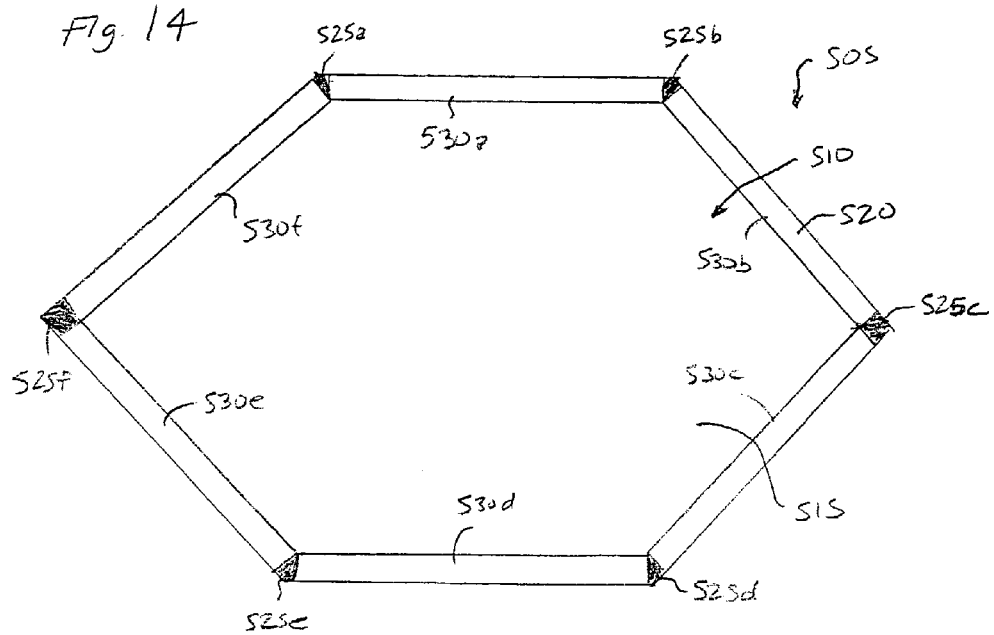
FIG. 14 is a plan view of yet still another touchscreen that can be used in the touchscreen system of FIG. 4.

FIG. 14 illustrates a touchscreen 505 with a hexagonal geometry. The touchscreen 505 comprises a resistive substrate 510 with an equilateral hexagonal perimeter and touch region 515, and a resistive band 520 that is disposed on the perimeter of the substrate 510 in order to frame the touch region 515. The touchscreen 505 further comprises six electrodes 525a–f that are respectively located in the six corners of the substrate 510 in electrical communication with the touch region 515. The resistive band 520 is divided into six band segments 530a–f by the six electrodes 525a–f. The resistive band 520 has an intermediate resistivity between the low resistivity electrodes 525 and the high resistivity touch region 515.

Three voltage excitations can be applied to the touchscreen 505 by applying a voltage to one of three selected pairs of electrodes, grounding the pair of electrodes opposite the selected pair of electrodes, and floating the remaining pair of electrodes. For example, a first voltage gradient can be generated by applying a voltage to electrodes 525a and 525b, grounding electrodes 525d and 525e and floating electrodes 525c and 525f. A second voltage gradient can be generated by applying a voltage to electrodes 525a and 525f, while grounding electrodes 525c and 525d and floating electrodes 525b and 525e. A third voltage gradient can be generated by applying a voltage to electrode 525e and 525f, while grounding electrodes 525b and 525c and floating electrodes 525a and 525d. The intersections of two equipotential lines can then be mapped to unique coordinates, with the third intersecting equipotential line being used to improve the accuracy of the mapping process.

Similar to the triangular touchscreen 405, only two voltage excitations may be applied to the touchscreen 505, or three voltage excitations can be applied to the touchscreen 505, but only two will be selected based on the which corner region is to be mapped. Of course, more than three voltage gradients may be generated to provide even more redundancy to the mapping process.

FIG. 15 illustrates a touchscreen 605 with a distorted pentagonal geometry. The touchscreen 605 comprises a resistive substrate 610 with an curved pentagonal perimeter and touch region 615, and a resistive band 620 that is disposed on the perimeter of the substrate 610 in order to frame the touch region 615. The touchscreen 605 further comprises five electrodes 625a–e that are respectively located in the five corners of the substrate 610 in electrical communication with the touch region 615. The resistive band 620 is divided into five curved band segments 630a–e by the five electrodes 625a–f. The resistive band 620 has an intermediate resistivity between the low resistivity electrodes 625 and the high resistivity touch region 615.

It can be appreciated that the curved geometry of the band segments 625a–e results in equipotential lines that are even more non-linear. The resistive band 620 has an intermediate resistivity between the low resistivity electrodes 625 and the high resistivity touch region 615.

Many possible voltage excitations can be applied to the touchscreen 605. For example, each electrode may be excited by a voltage, grounded, or left floating, thus giving $3^N$ combinations for N electrodes. Typically, only some subset of these combinations will be used in practice. For example, a first voltage gradient can be generated by applying a voltage to electrodes 625a and 625e, grounding electrodes 625b and 625c and floating electrode 625d. A second voltage gradient can be generated by applying a voltage to electrodes 625a and 625b, while grounding electrodes 625d and 625e and floating electrode 625c. A third voltage gradient can be generated by applying a voltage to electrode 625a and 625b, while grounding electrodes 625c and 625d and floating electrodes 625e. The intersections of two equipotential lines can then be mapped to unique coordinates, with the third equipotential line being used to improve the accuracy of the mapping process.

Similar to the triangular touchscreen 405, only two voltage excitations may be applied to the touchscreen 605, or three voltage excitations can be applied to the touchscreen 605, but only two will be selected based on the which corner region is to be mapped. Again, more than three voltage gradients may be generated to provide even more redundancy to the mapping process.

FIG. 16 illustrates a sphere 700 that is tiled with eight identical touch sensors 705, each of which has a non-planar triangular geometry. The sphere 705 can be a portion of a robot or any other apparatus that requires a touch location to be calculated when the sphere 700 is touched. Each touch sensor 705 comprises a resistive substrate 710 with a triangular perimeter that is disposed in a non-planar surface, and particularly in a spherical surface. The resistive substrate 710 also has a touch region 715. In the illustrated embodiment, the sphere 700 does not display any graphics, and thus, the touch region 715 can be opaque. As with the previously described planar triangular touchscreen 405, each touch sensor 705 further comprises a resistive band 720 that is disposed on the perimeter of the substrate 710 in order to frame the touch region 715. Each touch sensor 705 further comprises three electrodes 725a–c that are respectively located in the three corners of the substrate 710 in electrical communication with the touch region 715. The resistive band 720 is divided into three band segments 730a–c by the three electrodes 725a–c.

It can be appreciated that the use of a resistive band in the above-described non-rectangular touchscreens will improve the topological equivalence in the corners of the respective touchscreens. Further improvement can be achieved by providing the resistive band with a non-uniform linear resistance, e.g., by designing each band segment, such that it has a varying linear resistance along its length (similar to the touchscreens 105 and 305).

The use of resistive bands in touchscreens and touch sensors, and especially those with non-uniform linear resistances, may provide benefits other than improving the topological equivalents between the equipotential space and the Cartesian space (or other coordinate system). For example, when using mapping polynomials, the number of terms used can be reduced, e.g., from nine to five, without undue loss of accuracy. Or, if an LUT is used to map the equipotential lines, the number of points stored in the LUT can be reduced. In this manner, the amount of processing and/or the size of the LUT can accordingly be reduced.

This also has the secondary benefit of simplifying dynamic correction techniques, which are used to correct for material and manufacturing variances and changes in the touchscreen properties during customer use. Examples of material properties and manufacturing details that are subject to variances include average touchscreen conductivity, gradients in touchscreen conductivity, resistive-band conductivity, resistive-band width, and the like. These are a concern for touchscreen accuracy and can be rigidly controlled with consequent increases in manufacturing costs. It is desirable, however, to correct for these variances automatically, so that lower-cost touchscreens can be produced and the accuracy of the touchscreen can be maintained over a long duration in spite of aging effects.

Computer simulations have shown that common types of material and manufacturing variances can be defined and that mapping parameters can be customized to the current touchscreen properties. Measurements can be manually or automatically performed to provide information about the nature and extent of variances from nominal touchscreen performance. For example, by applying various voltages to the electrodes using the controller electronics, measurements of current flowing to those electrodes or of the potential measured on unbiased electrodes can be made. Additionally, touches at known positions could also supply information. These measurements can then be used to generate corrections to the nominal mapping algorithms. Significantly, the use of non-uniform resistive bands can simplify this correction processing by reducing the number of terms in the case of polynomial mapping, or reducing the number of points in an LUT if that is used to provide mapping capability. Further details regarding dynamic correction techniques are disclosed in U.S. patent application Ser. No. 10/246,059, published as U.S. Publication No. 2004/0061687, which is expressly incorporated herein by reference.

Although particular embodiments of the present invention have been shown and described, it should be understood that the above discussion is not intended to limit the present invention to these embodiments. Those of ordinary skill in the art will appreciate that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A touch sensor, comprising:
a substrate having a resistive touch region;
a set of electrodes electrically coupled to the touch region; and
a plurality of band segments framing the touch region and having an intermediate resistivity between the resistivity of the electrodes and the resistivity of the touch region, wherein the electrodes are disposed between the band segments, and at least one of the band segments has a linear resistance that varies along its length and has a width that varies along its length, each band segment being continuous or quasi-continuous along at least a portion of its length.

2. A touch sensor, comprising:
a substrate having a resistive touch region;
a set of electrodes electrically coupled to the touch region; and
a plurality of band segments framing the touch region and having an intermediate resistivity between the resistivity of the electrodes and the resistivity of the touch region, wherein the electrodes are disposed between the band segments, and at least one of the band segments has a linear resistance that varies along its length and has a thickness that varies along its length, each band segment being continuous or quasi-continuous along at least a portion of its length.

3. The touch sensor, comprising:
a substrate having a resistive touch region;
a set of electrodes electrically coupled to the touch region; and
a plurality of band segments framing the touch region and having an intermediate resistivity between the resistivity of the electrodes and the resistivity of the touch region, wherein the electrodes are disposed between the band segments, and at least one of the band segments has a linear resistance that varies along its length and comprises an array of electrically conductive elements, the conductive elements having a spacing or size that varies along the length of the at least one band segment, each band segment being continuous or quasi-continuous along at least a portion of its length.

4. A dynamic touch sensor system, comprising:
a touch sensor that generates touch information in response to a touch and generates measurable information indicative of a given electrical characteristic in the touch sensor, the touch sensor comprising a substrate having a resistive touch region, a set of electrodes electrically coupled to the touch region, and a band framing the touch region and having a resistivity intermediate the resistivity of the electrodes and the resistivity of the touch region, wherein the band has a substantially non-uniform linear resistance, the band being continuous or quasi-continuous along at least a portion of its length, and having a width that varies along its length; and
control electronics coupled to the electrodes for receiving the touch information and measurable information from the touch sensor, wherein the control electronics uses an algorithm to determine the coordinates of the location of the touch in the touch region based on the touch information, and modifies the algorithm based on the measurable information.

5. A dynamic touch sensor system, comprising:

a touch sensor that generates touch information in response to a touch and generates measurable information indicative of a given electrical characteristic in the touch sensor, the touch sensor comprising a substrate having a resistive touch region, a set of electrodes electrically coupled to the touch region, and a band framing the touch region, and a band framing the touch region and having a resistivity intermediate and the resistivity of the electrodes and the resistivity of the touch region, wherein the band has a substantially non-uniform linear resistance, the band being continuous or quasi-continuous along at least a portion of its length and having a thickness that varies along its length; and control electronics coupled to the electrodes for receiving the touch information and measurable information from the touch sensor, wherein the control electronics uses an algorithm to determine the coordinates of the location of the touch in the touch region based on the touch information, and modifies the algorithm based on the measurable information.

6. A dynamic touch sensor system, comprising:

a touch that generates touch information in response to a touch and generates measurable information indicative of a given electrical characteristic in the touch sensor, the touch sensor comprising a substrate having a resistive touch region, a set of electrodes electrically coupled to the touch region, and a band framing the touch region and having a resistivity intermediate the resistivity of the electrodes and the resistivity of the touch region, wherein the band has a substantially non-uniform linear resistance, the band being continuous or quasi-continuous along at least a portion of its length and comprising an array of electrically conductive elements disposed on the substrate, the conductive elements having a spacing or size that varies along the length of the band; and control electronics coupled to the electrodes for receiving the touch information and measurable information from the touch sensor, wherein the control electronics uses an algorithm to determine the coordinates of the location of the touch in the touch region based on the touch information, and modifies the algorithm based on the measurable information.

7. A touch sensor, comprising:

a substrate having a resistive touch region;

a set of electrodes electrically coupled to the touch region; and a plurality of band segments framing the touch region and having a resistivity intermediate between the resistivity of the electrodes and the resistivity of the touch region, wherein the electrodes are disposed between the bad segments, and at least one band segment comprises a continuous resistive background material and an array of electrically conductive elements disposed substantially perpendicularly along at least a lengthwise band portion of the at least one band segment in contact with the background material, the electrically conductive elements having a resistivity that is lower than the resistivity of the background material, the lengthwise band portion being quasi-continuous along its length.

8. The touch sensor of claim 7, wherein the resistive touch region is formed from the background material.

9. The touch sensor of claim 7, wherein the background material has a resistivity different from the resistivity of the touch region.

10. The touch sensor of claim 7, wherein the electrically conductive elements extend perpendicularly relative to the lengthwise band portion.

11. The touch sensor of claim 7, wherein the electrically conductive elements are generally arranged parallel to each other.

12. The touch sensor of claim 7, wherein the electrically conductive elements are composed of linear lines.

13. The touch sensor of claim 7, wherein the background material comprises a series of resistive segments alternately disposed between the conductive elements.

14. The touch sensor of claim 13, wherein each electrically conductive element has a fractional width defined by the dimension of the electrically conductive element along the lengthwise band portion over the sum of the dimension of the corresponding resistive segment along the lengthwise band portion and the dimension of the electrically conductive element along the lengthwise band portion.

15. The touch sensor of claim 14, wherein the fractional width is less than 0.9.

16. The touch sensor of claim 14, wherein the fractional width is between 0.2 and 0.8.

17. The touch sensor of claim 14, wherein the fractional width amongst the electrically conductive elements varies.

18. The touch sensor of claim 14, wherein the fractional width amongst the electrically conductive elements is uniform.

19. The touch sensor of claim 13, wherein the dimension of each of the resistive segments along the lengthwise band portion is less than 1 percent of the length of the at least one band segment.

20. The touch sensor of claim 7, wherein the continuous resistive background material and the array of electrically conductive elements are disposed along the entire length of the at least one band segment.

21. The touch sensor of claim 7, wherein the at least one band segment comprises the plurality of band segments.

* * * * *